Nov. 24, 1970 — L. C. BILLINGSLEY — 3,541,707
EDUCATIONAL DEVICE
Filed April 18, 1968 — 3 Sheets-Sheet 1
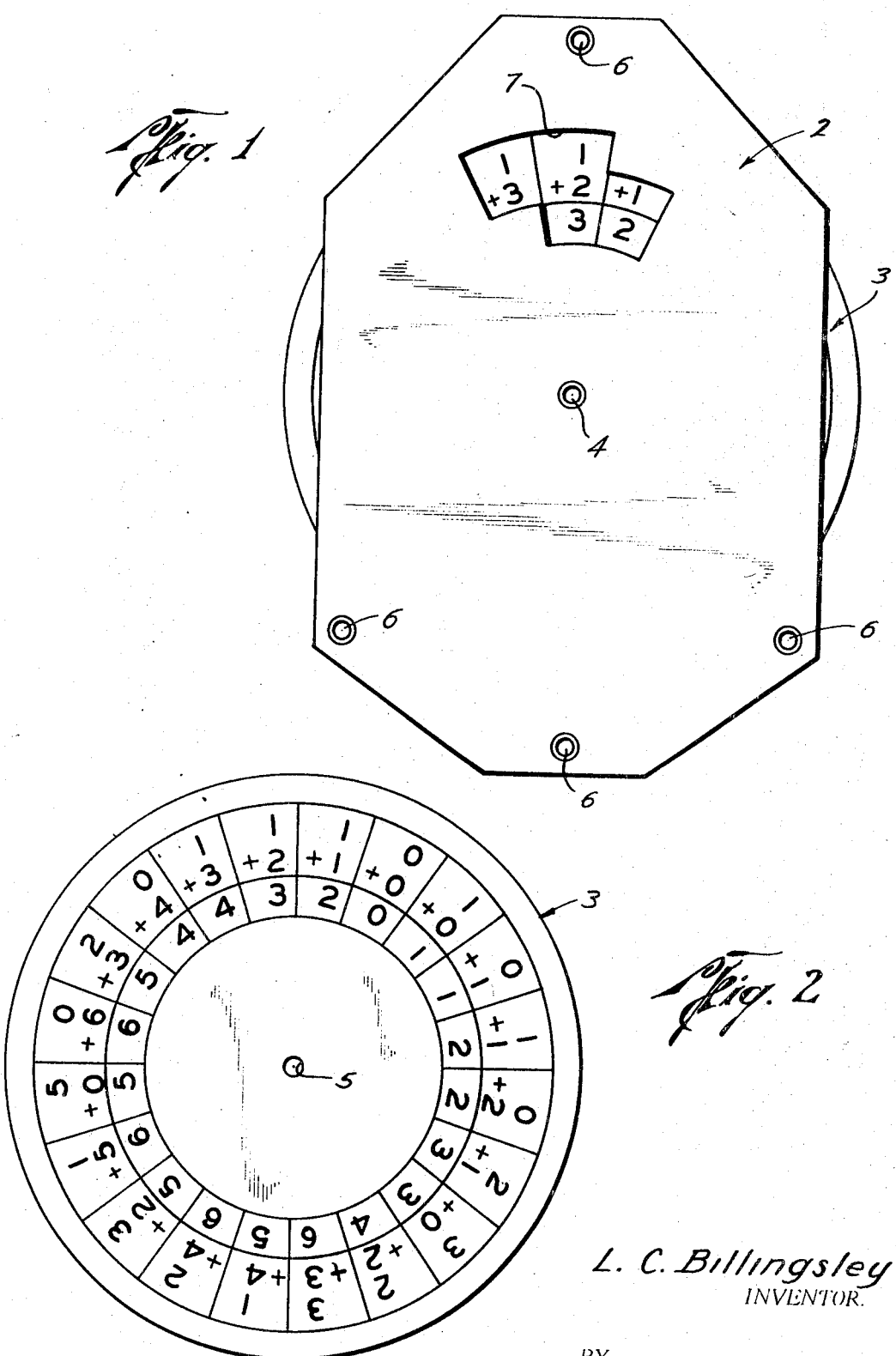
L. C. Billingsley
INVENTOR.
BY Bill B Berryhill
ATTORNEY Nov. 24, 1970
L. C. BILLINGSLEY
3,541,707
EDUCATIONAL DEVICE
Filed April 18, 1968
3 Sheets-Sheet 2
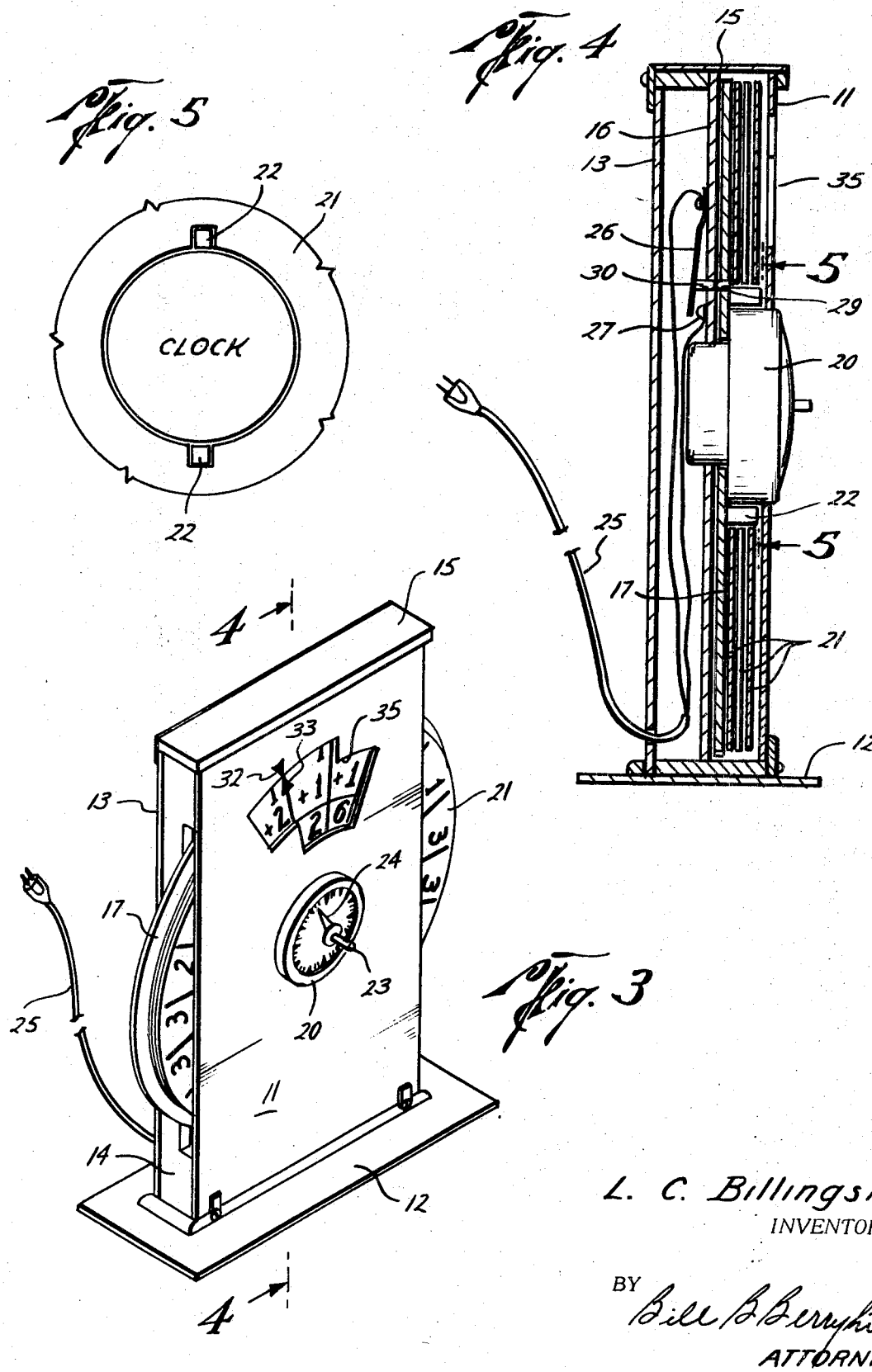

Nov. 24, 1970  L. C. BILLINGSLEY  3,541,707
EDUCATIONAL DEVICE

Filed April 18, 1968  3 Sheets-Sheet 3

L. C. Billingsley
INVENTOR.

BY
Bill B Berryhill
ATTORNEY

United States Patent Office 3,541,707
Patented Nov. 24, 1970

3,541,707
EDUCATIONAL DEVICE
Littleton C. Billingsley, P.O. Box 36,
Brookeland, Tex., 75931
Filed Apr. 18, 1968, Ser. No. 722,479
Int. Cl. G09b *19/02, 1/22*
U.S. Cl. 35—31           7 Claims

ABSTRACT OF THE DISCLOSURE

A teaching and testing device comprising a flat stationary masking plate and a number bearing member mounted for movement relative to the cover plate. An aperture means may be cut in the masking plate so as to reveal at least a portion of three different arithmetic expressions. One portion of the aperture means shows a binary problem in normal relationship. A second portion shows the same type of operation, but in inverse relationship. Another portion of the aperture means between the first and the second portion shows a complete binary problem and its solution.

BACKGROUND OF THE INVENTION

Field of the invention

The present invention is related to educational devices. More specifically it is related to devices for teaching fundamental arithmetic to elementary grade school children.

Description of the prior art

Various educational methods have been devised in the past to aid children in learning basic arithmetic operations. Flash cards have proved to be an effective method. They are, however, quite costly, cumbersome and slow. Other methods employing a number bearing rotating element covered by an apertured flat cover member have also been developed. Some of these devices are described in the following U.S. Pats. 1,992,366—Fisher; 2,065,424—Brubaker; and 2,965,980—Day. Most of the prior art either does not show the problem answers or requires turning the device around to show the answer Present day mathematics involve new techniques sometimes referred to as "new" or "modern" math. Although "new" math involves many new concepts one of the basic principles taught elementary grade children of today is the inverse operation, generally considered in the past to be an algebraic operation for more advanced students. To the applicant's knowledge, few completely satisfactory devices have been developed for teaching the inverse operation of "new" math.

In addition, although there seems to be many devices for teaching arithmetic there seem to be few which satisfactorily evaluate the performance of the student who uses such a device. With more and more emphasis on individuality and student's learning at their own pace, there is a need for evaluating individual student progress.

SUMMARY OF THE INVENTION

The present invention is a teaching device which not only teaches the basic arithmetic operations in normal relationship but also the inverse relationship taught in "new" math. Not only does the present invention visually present the arithmetic problem but it also visually discloses the solution in juxtaposition with the problem. The student, therefore, forms a mental image of the problem and solution for instant recall.

One embodiment of the invention comprises a circular plate mounted underneath a flat cover plate for rotation relative thereto. A number of arithmetic operations are radially imprinted on the rotating plate. An aperture is provided in the cover plate so as to reveal a portion of a normal arithmetic operation and a portion of an inverse operation. By moving the rotating plate in one direction the normal operation and its answer is displayed in a portion of the aperture. By moving the rotating plate in the opposite direction the inverse operation and its answer is displayed in the same portion of the aperture.

One embodiment of the invention also provides a timer which is connected to a switch. The switch is closed by moving the rotating plate in one direction and is opened again when the plate makes a complete revolution. Thus, the time a student requires to answer the problems of one program may be recorded. To test an individual his norm is first established by running through a program he knows. He may then be tested on new programs against this norm. Thus, individual testing is accomplished enabling the teacher and student to move on to another program once the student's norm is reached.

BRIEF DESCRIPTION OF THE DRAWINGS

FIG. 1 is a front elevation view of one embodiment of the invention;

FIG. 2 is a front elevation of the movable element of the embodiment of FIG. 1;

FIG. 3 is a perspective view of another embodiment of the invention employing a timing device;

FIG. 4 is a side elevation view, partially in section, of the embodiment of FIG. 3 taken along line 4—4;

FIG. 5 is a partial front elevation of the embodiment of FIG. 4 taken along line 5—5 showing the details of a slot and key arrangement.

DESCRIPTION OF THE PREFERRED EMBODIMENTS

Figure 6:
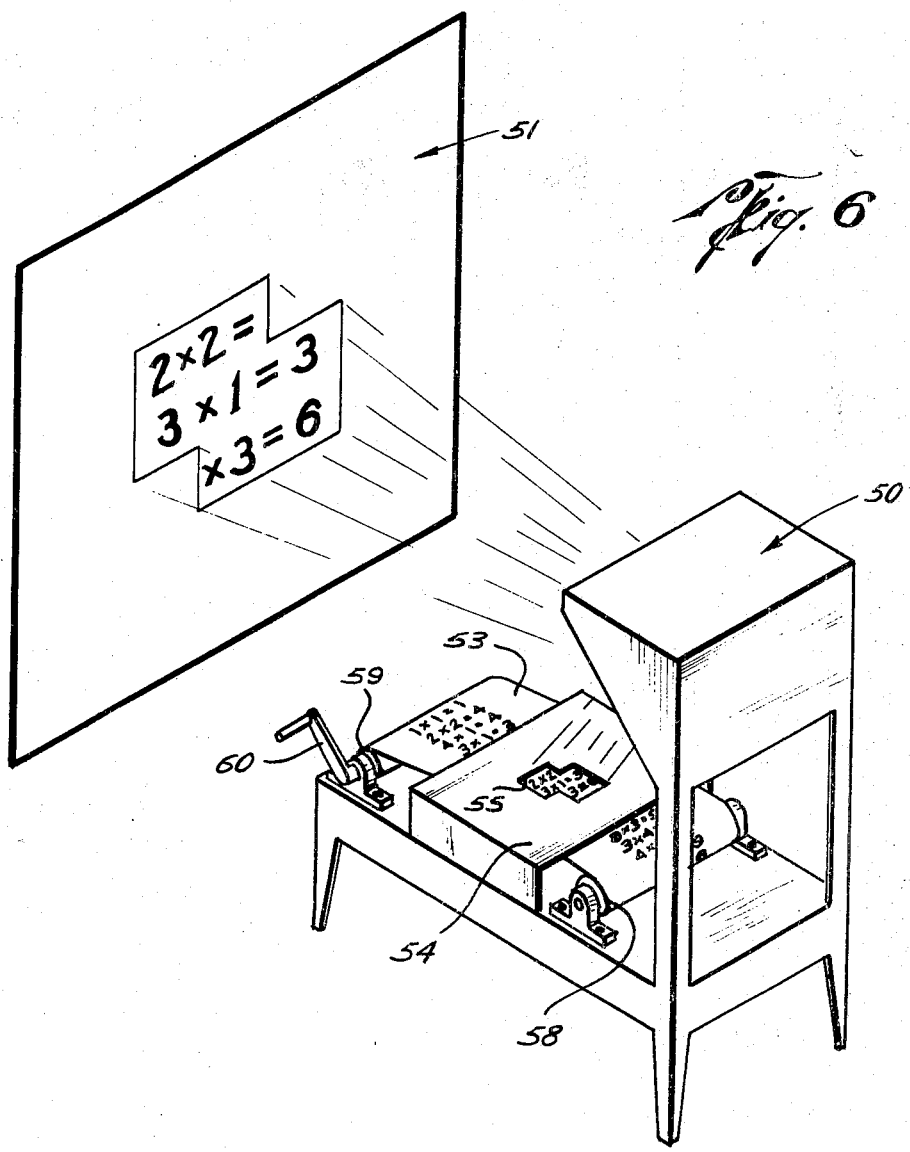
FIG. 6 is a perspective view of still another embodiment of the invention.

Referring first to FIGS. 1 and 2, one embodiment of the invention will be described. These drawings show a hand operated device comprising a flat cover plate 2 and a flat circular member 3 mounted for rotation on cover plate 2 by a pin 4 passing through plate 2 and hole 5 in circular member 3. Another cover plate (not shown) may be attached by rivets 6 or the like to plate 2 so that the rotating member 3 is sandwiched therebetween.

Rotating member 3 has a number of arithmetic operations radially disposed and printed thereon. The particular expressions shown in FIGS. 1 and 2 are addition facts. Of course, it should be understood that subtraction, multiplication or division may be shown thereon. Since each of these operations can be performed on just two numbers at a time, the term "binary," is applied to these operations. It can also be understood that these operations may be expressed in sentence form as well as the columnar form shown. In fact, both forms could be incorporated in one device by having two sets of facts, one in columnar form and the other in sentence form, on different diameters. "New" math textbooks generally contain approximately equal amounts of each form.

In addition, two numbers called addends are operated on to obtained a sum. For instance, in the uppermost problem shown in FIGS. 1 and 2, the addend "1" and the addend "2" are operated on to obtain the sum "3" (1+2=3). In terms universal to addition, substraction, multiplication and division this may be stated as associating with two numbers a third unique number called the "result."

Cover plate 2 is provided with an aperture 7 which is cut to show a portion of two operations and all of another operation at the same time. Thus, in FIG. 1, "1+3=?," "1+2=3," and ?+1=2" are shown. "1+3=?" is a normal addition problem. "?+1=2" can be stated as an inverse addition problem. Of course, "1+2=3" could be said to be the operation and solution of either type problems.

The inverse operation problems such as "?+1=2" are an important part of "new" math. In the past such problems were considered part of simple algebra not taught to elementary grade children. In algebra it may have been expressed as "X+1=2." However, today in "new" math this operation is being taught to elementary grade children.

It can easily be understood that by rotating member 3 in a clockwise direction the sum of the normal operation "1+3=?" will be shown in the middle of aperture 7 so that the problem and its solution may be viewed in normal relationship, i.e. "1+3=4." Thus, a student may work the problem, then rotate member 3 by hand to check his answer and get a mental image of the entire expression.

Likewise, the inverse operation "?+1=2" may be solved by the student and member 3 may be rotated in a counterclockwise direction to reveal the problem and its solution "1+1=2." It can be understood that this may also be done for multiplication, subtraction and division as well.

It can, therefore, be seen that a series of problems programmed for their degree of difficulty may be printed on the rotating member 3. One such program is shown in FIG. 2. The student may then work all the problems in normal operation or inverse operation and immediately check his answers by rotating the circular member 3 in either direction depending on which operation he is performing, normal or inverse.

Member 3 could be printed on each side and the other cover plate (not shown) could be provided with an aperture similar to aperture 7. Thus, two programs could be embodied in the one device. Circular member 3 could also be replaced with similar members having different programs imprinted thereon.

Referring now to FIGS. 3 and 4 another embodiment of the invention is shown which enables a teacher or student to determine the time required for each individual to complete a program. This embodiment comprises a case 10 which includes a flat face plate 11, a support base 12, back cover 13, side panels 14, and top cover 15. A support panel 16 is attached to case 10 to support a rotating base plate 17 and a timing device 20.

One or more rotating program members 21, similar to circular plate 3 in FIGS. 1 and 2 are mounted around timer 20 and keyed to base plate 17 by a slot and key arrangement 22. As seen more clearly in FIGS. 4 and 5 the program members are slotted and the keys are attached to rotating base plate 17. These program members 21, therefore, rotate with plate 17.

Timer 20 is electrically connected to any suitable outlet by electrical cord 25. A switch comprising a lever arm 26 and a contact 27 is provided in series with one of the cord wires. A raised "bump" 29 is radially disposed on the back of base plate 17 to cooperate with a corresponding "bump" 30 on lever arm 26 to open the switch when the bumps are in register. The point of registration is marked by index arrows 32 and 33 on face plate 11 and rotating program member 21 respectively. Thus, when the indexes are in register the switch is open but when they are out of register the switch is closed so that timer 20 is operative.

Face plate 11 is provided with an aperture 35 similar to the one described with reference to FIG. 1. The aperture 35 reveals a portion of two arithmetic operations and the entirety of another.

This embodiment functions similarly to the one shown in FIGS. 1 and 2 with the additional aid of a timing mechanism. Thus, by starting with indexes 32 and 33 aligned as shown in FIG. 3, a student's speed in completing one program may be determined by rotating member 21, as the student's answers are given to each problem, through one complete cycle until the indexes are once again aligned. The timer switch is closed once rotation begins and opened again after one cycle. This, of course, may be done for both the normal operation and the inverse operation depending on the direction of rotation. The timer may be reset each time by rotating dial 23 and hand 24 through a magnetic clutch common in clock art.

The purpose of this timing device is to individually test a student. The norm of each student may be determined by timing his response to a program which he has mastered. A new program may then be inserted and the student's response thereto timed. When he has reached his norm, the student may move on to other programs.

Another embodiment of the invention is shown in FIG. 5. This embodiment is for classroom instruction of a number of students. It comprises a projection machine 50 and screen 51 of any suitable commercially available type. A movable programmed problem bearing member 53 may be installed between the light transmitting element of projector 50 and screen 51. It is partially covered by opaque stationary cover 54. Cover 54 is provided with an aperture 55 as described with reference to the foregoing embodiments. Projector 50 projects the numbers within aperture 55 on screen 51 for accessibility to an entire class.

Problem bearing member 53 may be a roll of substantially transparent paper connected to rollers 58 and 59. A crank 60 may be attached to the rollers for moving from one problem to another. Although the construction of this embodiment is somewhat different, its principles are similar to the embodiments of FIGS. 1, 2, 3, 4 and 5. In fact, constructions similar to those shown in FIGS. 1, 2, 3, 4 and 5 could be used for projection also. In such a case the rotating members 3 and 21 would be substantially transparent with opaque numbers.

Although only a few preferred embodiments of the invention have been described herein, it is obvious that many variations may be made by one skilled in the art without departing from the spirit of the invention. It is, therefore, intended that the scope of the invention be limited only by the claims which follow.

I claim:

1. An educational device comprising
    a cover member and
    a number bearing member movably mounted in relation to said cover member, said number bearing member having a plurality of sets of numbers representing binary arithmetic operation and their results imprinted thereon,
    said cover member being provided with aperture means through which numbers to be operated on are revealed, said aperture means comprising an intermediate portion and two side portions on opposite sides of said intermediate portion, adjacent thereto and near opposite ends thereof,
    said number bearing member being positionable whereby at least two sets of said numbers are revealed through said aperture means, one set shown through one of said side portions and arranged for normal operation, the other set shown through the other of said side portions and arranged for inverse operation, said number bearing member being movable to positions whereby each set of said numbers and the result of said operations may be revealed through said aperture means intermediate portion.

2. The combination of claim 1 wherein said number bearing member is movable in one direction to reveal said one set of numbers and the result of said normal operation and movable in the opposite direction to reveal said other set of numbers and the result of said inverse operation.

3. The combination of claim 1 wherein a third set of said numbers and its associated result is revealed through said aperture means intermediate portion simultaneously with said two sets of numbers.

4. An educational device comprising,
a masking member and
a number bearing member
   mounted for movement relative to said masking member,
   said number bearing member having a programmed plurality of sets of numbers representing binary arithmetic operations imprinted thereon,
   said masking member being provided with aperture means, having an intermediate portion and two side portions adjacent thereto, on opposite sides thereof and near opposite ends thereof, through which at least two sets of numbers are shown for operation thereon, one set shown through one of said side portions expressed for normal operation, the other set shown through the other of said side portions expressed for inverse operation,
   said number bearing member being positionable to reveal said sets of numbers and the results of said operations thereon through said intermediate portion of said aperture means.

5. The device of claim 4 and timer means attached to said educational device actuatable on the movement of said number bearing means to record the time of movement through complete revelation of the results of said programmed operations.

6. The device of claim 8 and index means associated with said masking member and said number bearing member,
   said timer means being provided with switch means engageable with a portion of said number bearing member to interrupt power to said timer means when said index means is in registration.

7. The device of claim 4 wherein said number bearing member is positionable in one direction to reveal one of said sets of numbers and the result of said operation thereon and positionable in another direction to reveal another of said sets of numbers and the result of said operation thereon.

References Cited
UNITED STATES PATENTS

| | | | |
|---|---|---|---|
| 1,641,982 | 9/1927 | McDade | 35—75 |
| 2,311,055 | 2/1943 | Kopas | 35—9 X |
| 2,507,215 | 5/1950 | Miltenberg et al. | 35—9 |
| 2,792,993 | 5/1957 | Schramm | 35—31.1 X |

FOREIGN PATENTS 249,888      Switzerland.

WILLIAM H. GRIEB, Primary Examiner

U.S. Cl. X.R.

35—74, 76